April 14, 1953  J. V. MARTIN  2,634,816
AUTOMOBILE STRUCTURE
Filed Feb. 14, 1946  7 Sheets-Sheet 1
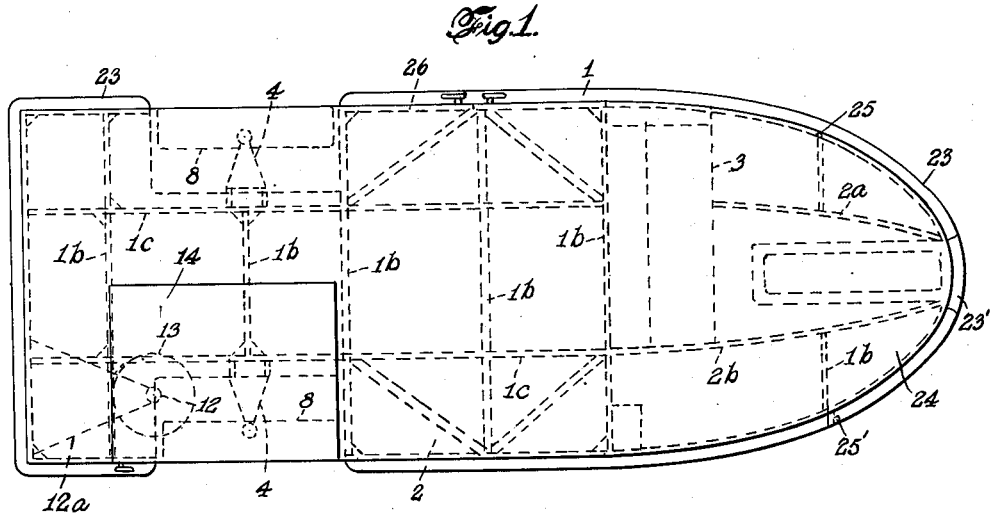
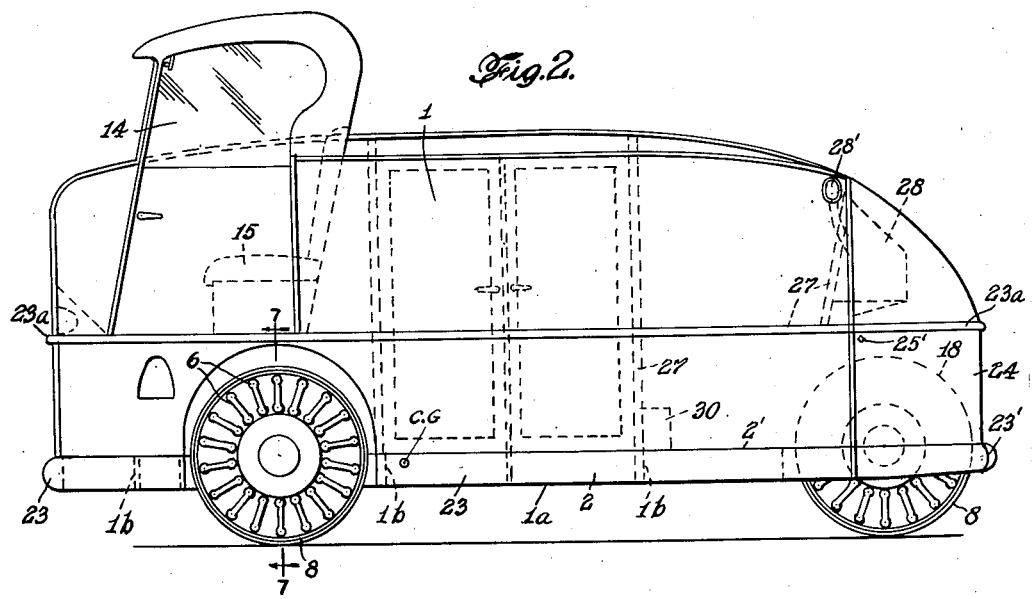
INVENTOR.
James V. Martin

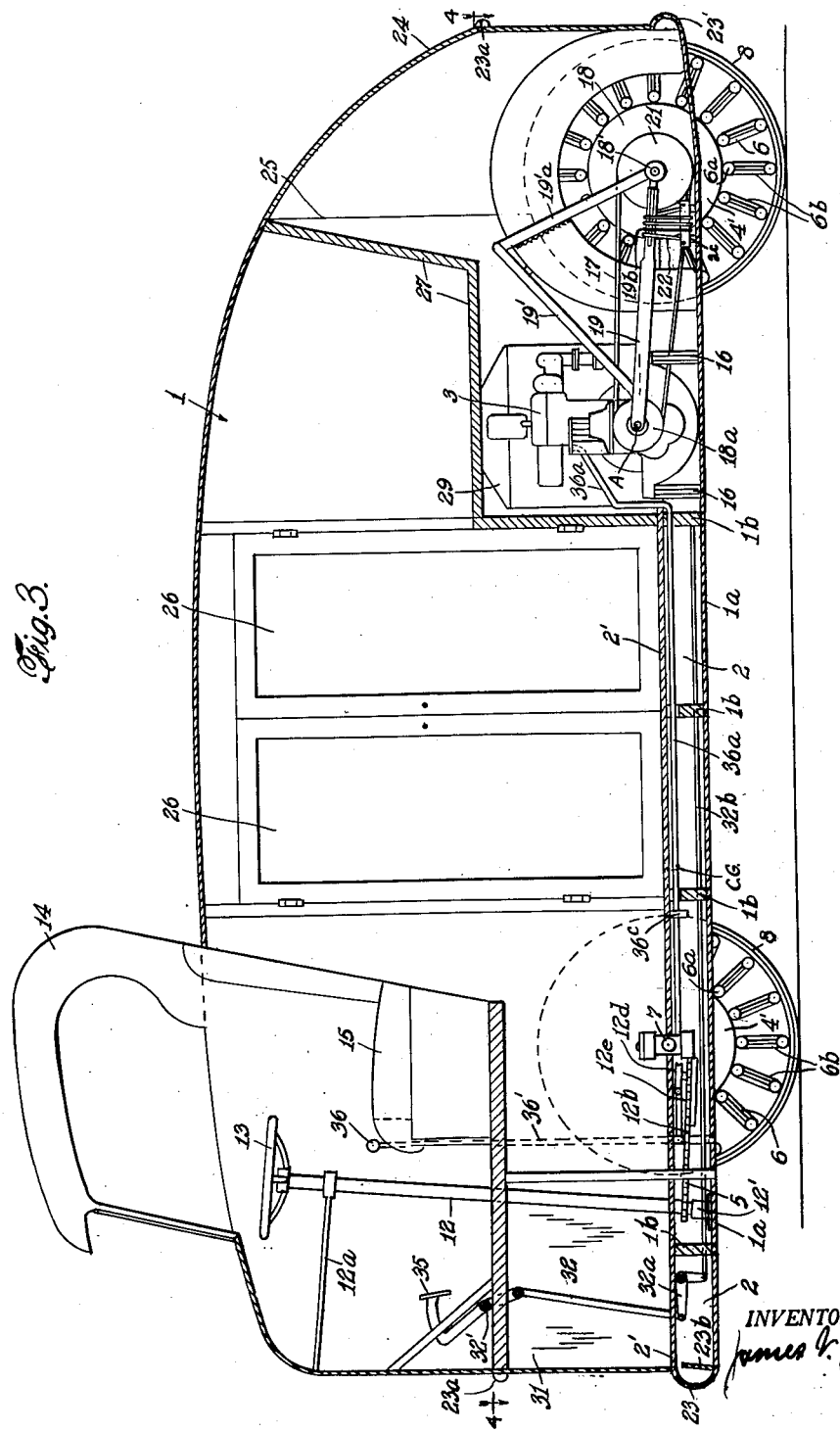

April 14, 1953  J. V. MARTIN  2,634,816
AUTOMOBILE STRUCTURE
Filed Feb. 14, 1946  7 Sheets-Sheet 3
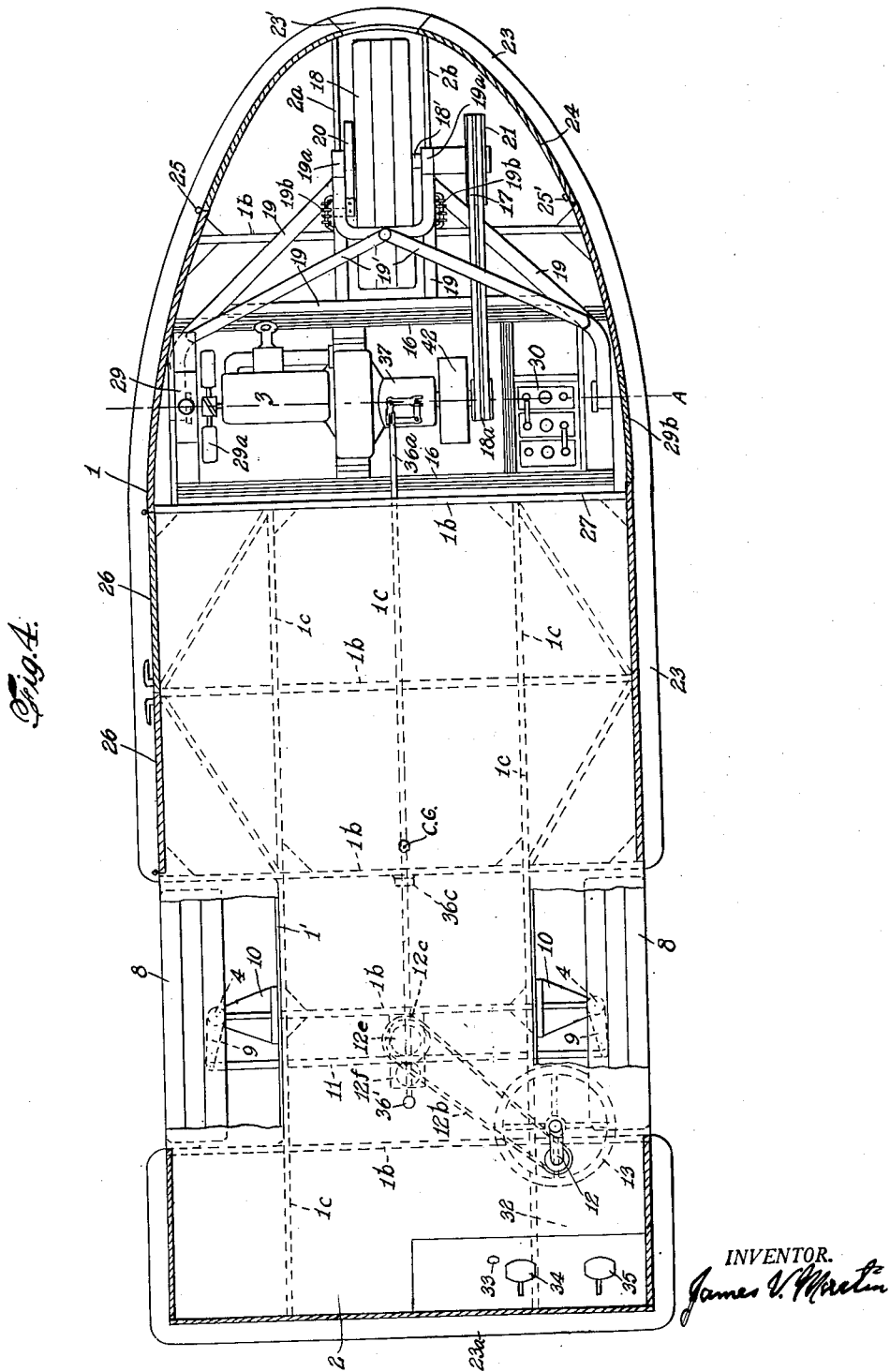

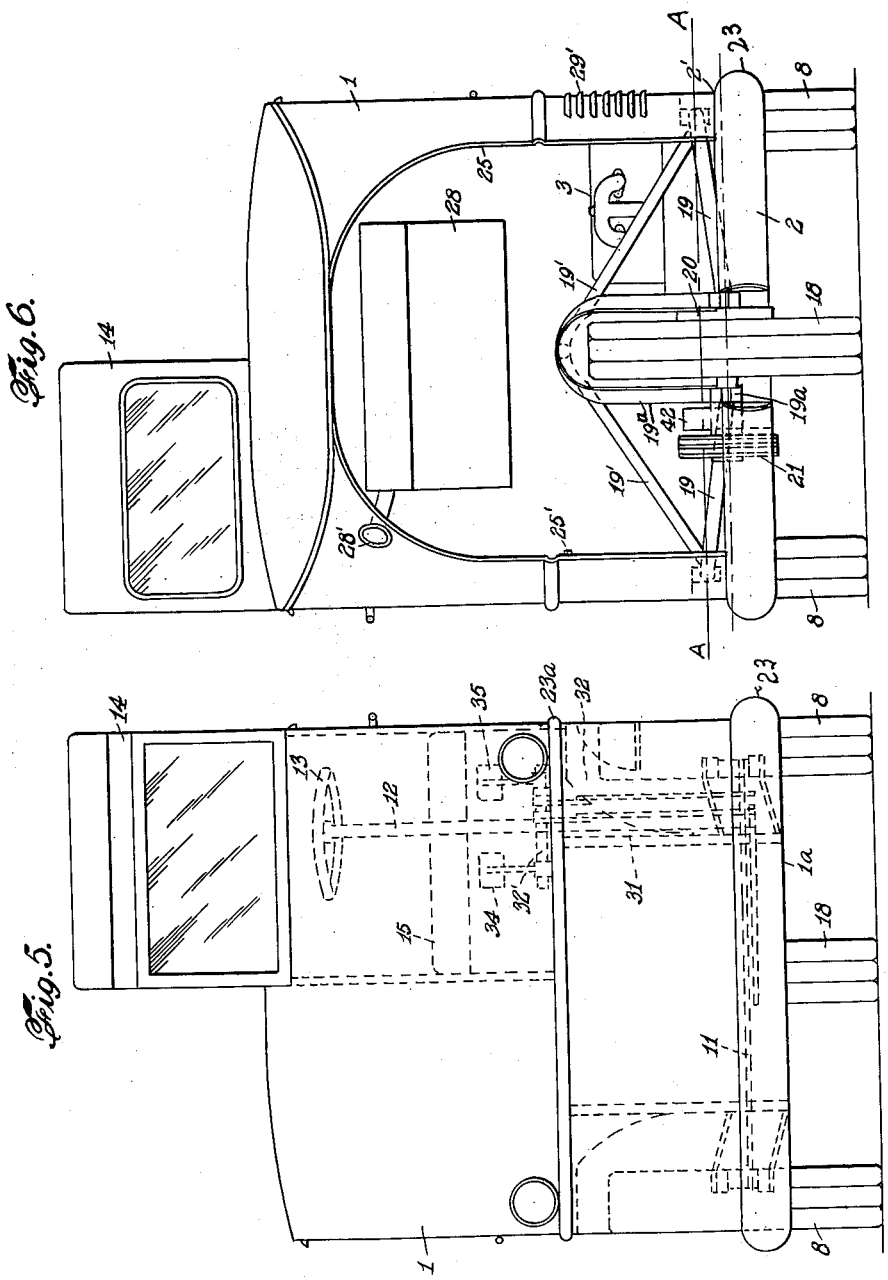

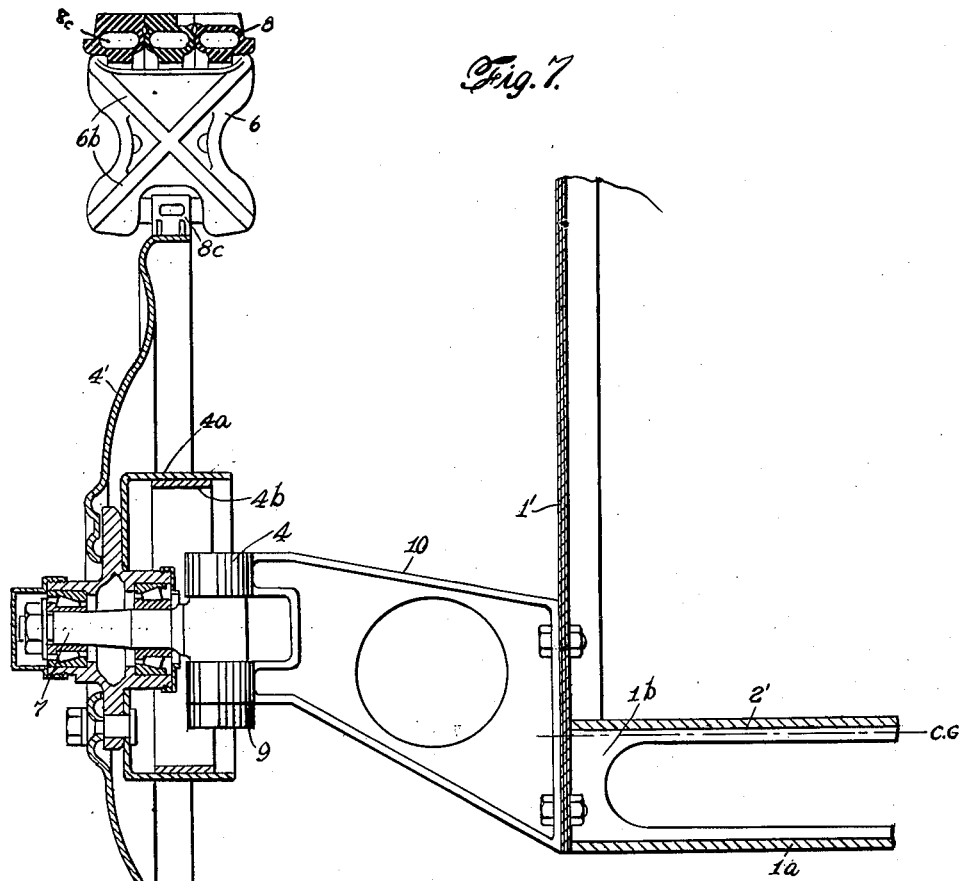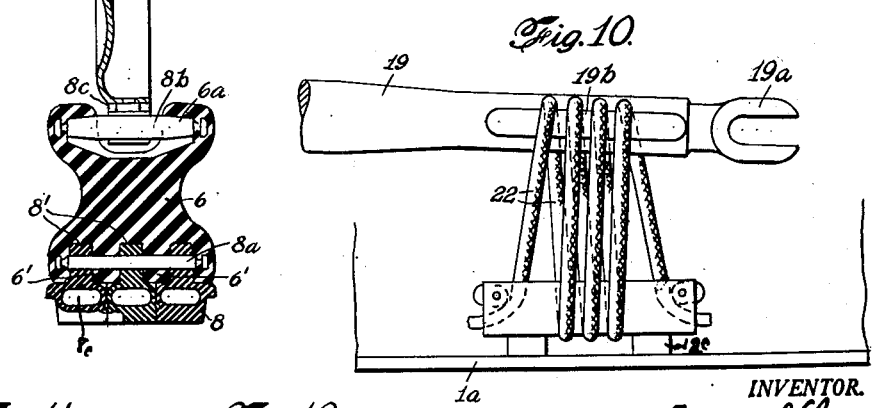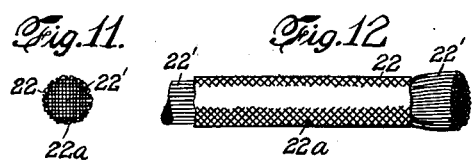

April 14, 1953   J. V. MARTIN   2,634,816
AUTOMOBILE STRUCTURE
Filed Feb. 14, 1946   7 Sheets-Sheet 6
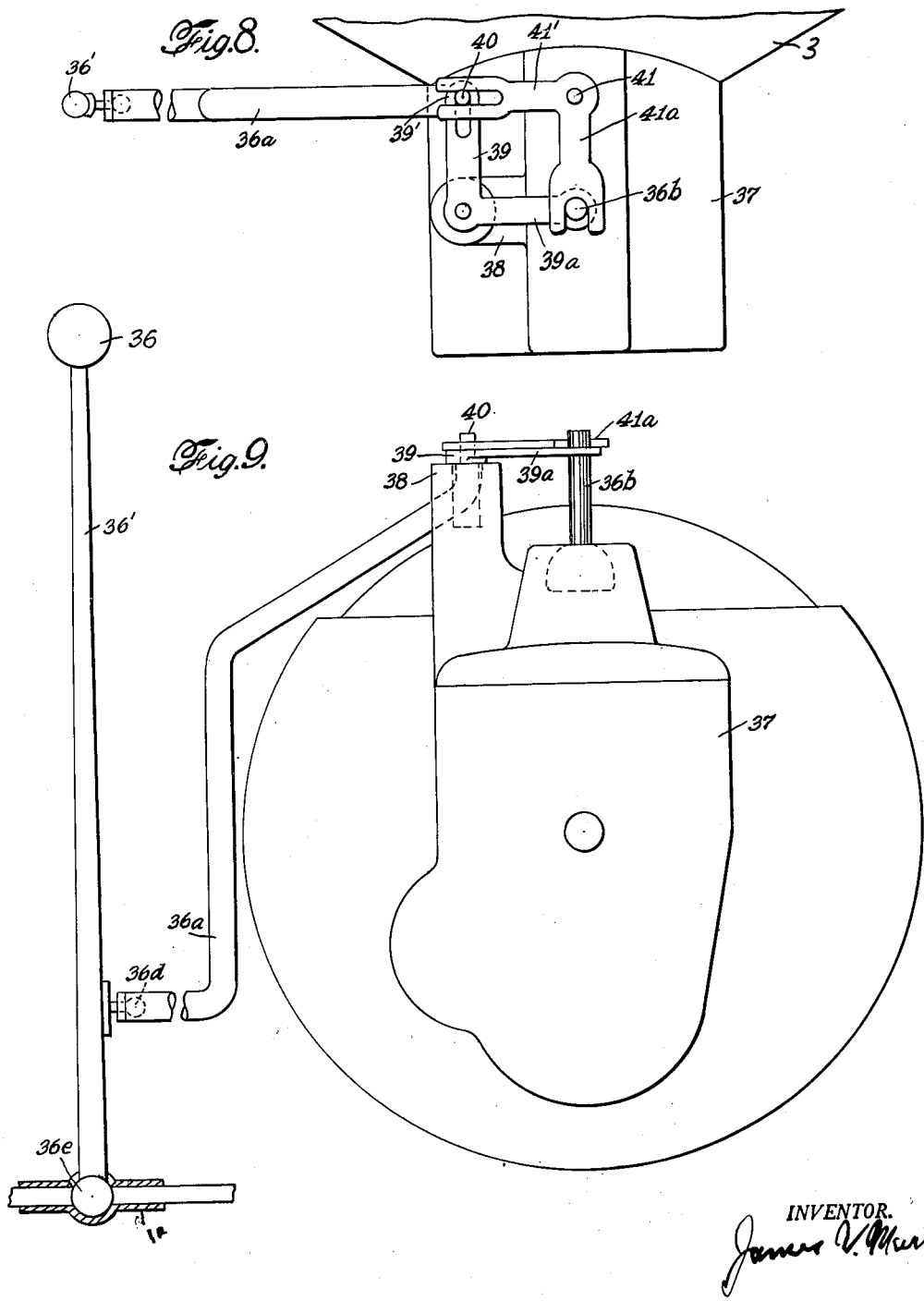
INVENTOR.
James V. Martin April 14, 1953   J. V. MARTIN   2,634,816
AUTOMOBILE STRUCTURE
Filed Feb. 14, 1946   7 Sheets-Sheet 7
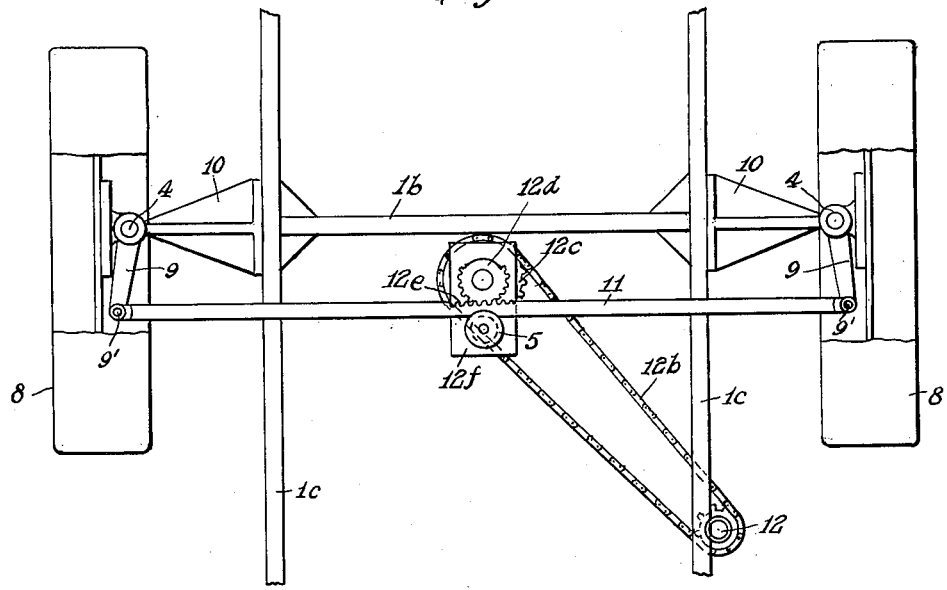
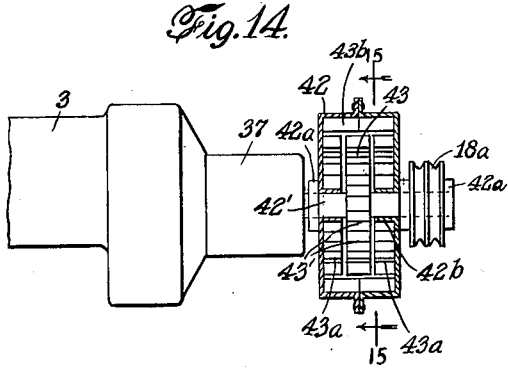
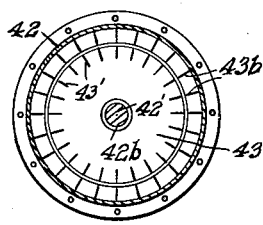
INVENTOR.
James V. Martin Patented Apr. 14, 1953

2,634,816

UNITED STATES PATENT OFFICE 2,634,816

AUTOMOBILE STRUCTURE

James V. Martin, Rochelle Park, N. J.

Application February 14, 1946, Serial No. 647,550

4 Claims. (Cl. 180—25)

This invention relates to automobiles and more particularly to modern or streamlined power driven vehicles having regard to novel placement of the motor, transmission and suspension for the said vehicle in relation to the driver's location and to the means for control of the motor and transmission from a comparatively remote position.

Further objects are concerned with the simplification of auto construction by the elimination of parts heretofore deemed necessary and by structural changes in the remaining parts to make them serve roadability and lower construction costs.

It is still a further object to supply novel means to lower the center of gravity of the vehicle and to place said center of gravity, in relation to the yieldable suspension for the vehicle so as to increase stability, particularly on turns, over that obtainable heretofore.

Still further objects of my invention will become apparent through the following description read in connection with the accompanying drawings and appended claims.

In the drawings I have given one preferred embodiment of my invention, illustrated in a light delivery or van type vehicle, but it will be understood that the novel combinations and arrangements of parts may be changed within the scope of the claims to adapt them to different classes of vehicles without departing from the teachings of my disclosure. Reference is made to U. S. Patents 1,712,151 and 1,989,995 and 2,121,504. Having reference to the drawings:

Fig. 1 is a plan view, looking down upon the top of my van and indicating in dotted lines some of the bracing for my van sub-body or box-like body sill.

Fig. 2 shows a view of the left side of the van in elevation, while

Fig. 3 shows an interior view in elevation as it would appear if the left side of the van were removed in Fig 2.

Fig. 4 is a plan view taken along the line 4—4 of Fig. 3 with parts broken away.

Fig. 5 is a view in front elevation of the van and Fig. 6 is a rear elevational view with the rear door taken off.

Fig. 7 is a front wheel assembly elevational view, partly in section, taken along the line 7—7 of Fig. 2 and showing the front steering wheel body bracket, wheel, brake and novel tire I employ.

Fig. 8 is a view looking down on the top of the power transmission case or gear-box as it is called, and showing my device for converting control movements for said gear box through a right angle.

Fig. 9 is a left end view of the said gear box and connecting levers.

Fig. 10 shows a side elevational view of aviator cord suspension for one side of the swinging frame which carries my rear drive wheel, Figs. 11 and 12 show enlarged views of the aviator cords themselves.

Fig. 13 is a view looking down on part of my steering means, and on the lower portions of the body sill fore and aft bracing, Fig. 14 is a view, partly in section showing the interior of my new fluid drive, and Fig. 15 is a view taken along the line 15—15 of Fig. 14.

Proceeding now to the more detailed description of my invention, like numerals will represent similar parts throughout the several views:

1 indicates the body of my type of vehicle; this is not a cover for a chassis frame as in conventional autos, but my body is the principal part of my auto and is an integral whole having, as an essential part, a box-like lower portion or sill 2 to which the power unit 3, the resilient wheel assemblies 4 and the steering gear 5 are bolted. Fig. 7 shows, to enlarged scale, a steering wheel assembly connected to the body by a bracket 10.

The entire weight of my goods van is carried yieldably through tension spokes 6 which carry the vehicle weight, in tension only, from the stub-axle 7 or steering spindle as it is called for the front wheels, to flexible tread hoops 8 which together with said spokes replace the conventional pneumatic tire on all my van wheels. My spokes are molded shorter than their assembled length in order to give them sufficient tension to carry the static and dynamic loads of the vehicles and thus no loads are carried in compression or displacement: In other words the yieldable means for absorbing and dissipating road shocks resides almost entirely in the tension of the spokes and the flexibility of the tread hoops of my tire, the spokes themselves being adapted in form and by their method of assembly to buckle and to otherwise refuse to carry compression loads. Reference is made to U. S. Patent 2,283,274 and to my Patent No. 2,492,433, issued December 27, 1949.

It will be noticed that an important and unexpected result flowing from my complete springing of my van in tension rubber as above described permits me to locate most of my heavy weights lower, i. e. nearer to the ground than conventional practice makes possible: For example note that my power unit and part of the transmission is located below the floor 2' of my box-like body bottom 2, also the goods carrying floor 2' of my van is actually slightly below the stub-axle spindle 7, see Fig. 7.

Having in mind that all of my tire spokes are under tension, when load is applied to the wheel 4', see Fig. 7, then the spokes under the wheel contract and the spokes above the wheel take on more tension, become longer and carry more of the vehicle loads: For a diagrammatic view of the tire loaded see Fig. 10, of U. S. Patent No. 2,050,352.

Since the heavy and sturdy portions of my van are all concentrated in or on the box-like sill 2 of my body 1, I secure an extremely low center of gravity indicated by CG in the Figs. 2, 3 and 4. Thus, my CG is so far below my yieldable support that on a turn my sprung weight of vehicle tends to bank inwardly of the turning circle instead of tending to capsize the vehicle as in conventional practice see broken line marked CG in Fig. 7 and indicating height of the CG. This remarkable relation of the center of gravity to the vehicle yieldable support permits simplification to a degree heretofore unattained, for example a stamped metal bracket 10 see Fig. 7 can be bolted to the ply-wood side 1' of my body near its sill 2 and the tie-rod 11, can be employed directly through the body side walls for steering connection to the lower end of the steering column 12 without the need for either a steering lever or the well known, but costly ball-socket joints found in conventional cars. The hand steering wheel 13 is conveniently located in a driver's cab 14 affording clear vision in all directions over the top of the van. A comfortable seat 15 for the driver is located in the cab 14 directly behind the steering wheel 13. It is understood that the upper portions of the van are constructed of comparatively light weight materials. The bottom of the van 2 can be constructed of plymetal or suitable substitute. On the extreme bottom 1a of the van I have provided laminated engine bearers 16 and I have positioned the motor 3 at right angles to its usual installation in conventional vehicles.

This arrangement including its location to one side of the vehicle center fore and aft line accomplishes a number of further simplifications, to wit, a direct and silent V-belt drive 17 can be had to a centrally located drive wheel 18 in the streamlined rear part of the van, this saves most of the complication and weight associated with what is conventionally known as the "Rear Drive Axle Housing" of an auto, also eliminated are the usual universal joints and drive shaft. I provide a simple, but rugged tubular swinging frame 19 which I journal in the motor crank shaft axis A. This frame has a bridge-like truss 19' to hold the wheel 18 and its tire 8 in lateral positions when running in ruts or on turns. The wheel 18 rotates on a short axle 18' journalled in an adjustable fork 19a of the frame 19 and this axle 18' also carries a brake drum 20 and two V belt large diameter driven pulleys 21. As the rear wheel in a properly streamlined auto runs over the center of country roads as contrasted with the sides of the road and therefore is subject to more ruts and bumps, I have provided an additional tension yieldable support 22 in the form of rubber threads 22' held in initial tension by a double wrapper of cotton brading 22a, see Figs. 11 and 12. These cords 22 are attached to the van bottom 1a in loops at 2c and to the swinging frame 19 at 19b. Great strength is given the lower portion of sub-body 2 at its rear by the vertical braces 2a and 2b, see Figs. 1 and 4 and also by the strong guard strip 23: The entire rear portion of the car is made available for inspection through a large rear door 24 hinged at 25 and locked at 25' by a socket wrench. This door 24 carries at its central lower rear part that portion 23' of the guard or bumper strip 23 which would otherwise prevent the rear wheel 18 from being removed rearwardly from its frame fork 19a. It will be noticed, see Fig. 3, that I have tapered upwardly the rear bottom portion of 2 to improve airflow and appearance. Fig. 4 shows how I have fitted the bumper part 23' on bottom of swinging door 24 so that a blow received from the rear will be resisted by adjacent parts 23 of the guard strip where they are braced by 2a and 2b of my boxlike body base.

At the level of the cab 14 floor I provide an upper guard strip 23a. The cab is shown on the left or port side of the van and the doors 26 opening into the goods compartment of the van are shown as on the starboard or right side, but it is contemplated to arrange their relative positions most conveniently for the traffic regulations in a respective country; for example in England, where they have left hand driving on the road it might be most convenient to have both the cab 14 and the cargo doors 26 located on the port side of the van so the driver could get out on the sidewalk side and also be near the cargo doors if they were also on the port side of the van.

One of the unexpected results of this combination which I disclose, see Fig. 3, is to have the cargo space relatively large and most centrally located with large access, the doors 26, between the high vision cab and the power unit-drive wheel compartment. It will be noticed that this arrangement not only makes for convenience, but also blends gracefully into the best streamlined form for the van, thus saving fuel for high speeds.

A fume and sound proof partition 27 divides off the goods compartment from the rear drive compartment and hung on the rear of the upper part of this partition is the gas tank 28, which has an intake lead 28' through the partition and port side wall of the van to a handy external position. The radiator 29 is located opposite the motor 3 and has air louvers 29' directly adjacent thereto and a power driven fan 29a near its inner part. A battery 30 is conveniently located opposite the radiator and is accessible through a side wall door 29b.

All of the cubic space forward along-side the driver's cab is part of the extensive goods compartment as well as most of the space under the cab floor, but directly inside of the port wheel housing 31 I provide a small space 32 partitioned off from the goods compartment and through which I pass the steering, brake, transmission and motor controls from the driver's cab down into the sub-body 2: For example the steering column 12, the accelerator control 33, the brake control 34 and the clutch throwout means 35 all lead down through the space 32. Where, as in the case of the clutch throwout 35 or the brake foot control 34 these are not in line with the space 32, I carry the control through an appropriate shaft 32' to the place of proper alignment.

The gear box control 36 is mounted alongside a cutout portion of the driver's seat and has a shift lever of conventional pattern 36' and means 36d at its base in the sub-body 2 to push and pull and give lateral movement to a lever 36a: This lever has a pivot 36c (Fig. 4) between the cab position and the transmission box 37, Figs. 8 and 9. This sliding gear transmission box contains the conventional three speed and reversing gears in the same relationships in use over most of the automobile world and therefore same are too well known by those skilled in the art to make it worth while to show same in my drawings. However, I am concerned with the problem of translating the movements of the van driver in his cab, which are conventional in every respect to convert them through a right angle and have them produce the same effect as though the motor 3 and gear box 37 were turned fore and aft as they usually are.

To accomplish this I provide a pivot base 38 for a right angle crank 39, one end of this crank has a slotted end 39' encompasing a vertical pin 40 on the rear end of lever 36a the opposite end of the crank has arm 39a which fits about the gear box shift 36b, so that a push rearward on lever 36a will cause pin 40 to move the right angle cranks 39 and 39a so as to move 36b toward the port side of the van, but this is equivalent to moving said gear lever backward away from the motor 3 if said motor were positioned fore and aft as it usually is in autos. A pull on lever 36a will reverse the gear lever 36b moving same toward the motor 3. I have arranged another pivot 41 with a forked crank 41' about the lever pin 40 and that also has a right angle forked end 41a which fits about shift lever 36b to move same fore and aft relative to the van when said lever 36a is moved laterally of the van about its said pivot 36c so as to impress the pin 40 at right angles to the push and pull movement.

For a follow-through of three speeds forward and one reverse a typical example will suffice; To throw conventional gear box 37 into number one, or low speed gear, pull hand lever 36' rearward and to the left of van, the rearward movement, see Figs. 8 and 9, push on shaft 36a will move gear lever 36b to the left of van as explained above, the movement of hand lever 36' to the port side of van will, because of the pivot 36c, cause the rear part of lever 36a to swing pivot pin 40 (see Fig. 8) toward the right side of van then crank 41' will be moved to the right by pin 40 and its other arm 41a will move gear shift lever 36b toward front of van or toward what would be the left side of a vehicle if the motor were located ahead of gear box 37 and in a fore and aft position such as seen in conventional practice. The other movements such as into second speed, high speed and reverse will be accomplished by the above mechanism so that anyone driving the van would not have to think of any new or different movements of his hand lever to accomplish the similar shifting results be obtained in conventional motor and gear box arrangements. The ball-sockets 36d (Fig. 9) and the anchorage ball socket 36e for the lever 36' will be readily understood by those acquainted with the art.

The steering gear for my van is most simple, the tubular column 12 being supported in the sub-body 2 by a bracket 12' and steadied by a triangular instrument panel 12a, a chain 12b transfers the steering movement from the lower end of the column to a large sprocket 12c and this turns the pinion 12d which works the rack teeth 12e on the steering tie rod 11 which goes through the grease box 12f. This tie-rod 11 is not unsprung like conventional tierods, but is sprung by the tension rubber spokes 6 at the top of the elastic spoke type tire, therefore the ends of 11 can be journalled around an oil bushing 9' and made to turn the tierod levers 9 which move vertically, due to spokes 6, along with the steering spindle 7 in the end bushings of bracket 10. One of the several lower body braces 1b is located, see Fig. 4 so as to brace the side walls 1' of the wheel housing adequately. The tie-rod 11 passes through these sidewalls from pinion 12d to tierod bushings 9' see Fig. 13. It will be noticed that the thwartship braces 1b are appropriately lightened by openings such as seen in Fig. 7 so that ventilation can pass through the lower body as well as controls like the lever 36a. The air can flow into the body sub-bottom 2 through grill openings 23c in the front of guard strip 23, see Fig. 3, and water will drain out at the front bottom of baffle 23b, thus keeping the subbody clear of gases and aiding the cooling of the motor compartment in rear of car. The complementary braces 1c are arranged in a fore and aft direction between the floor 2' and the body bottom 1a. This lower body bottom is perfectly smooth from the extreme front of the van to its extreme rear, is tapered upwardly at its rear, and is further braced by the engine bearers 16 and by the side walls of the body and by fore and aft braces 2a and 2b and by the guard strip 23. The clutch control for my van is conventional in operation although operated through a bell crank for right angle change of direction after the fashion of the bell cranks shown in Fig. 8 for the gear box. Anyone acquainted with the art will understand that the clutch throwout pedal 35 pivots about the shaft 32' and through the bellcrank 32a pulls the rod 32b, which through another bellcrank pulls the conventional clutch against spring action. The brake pedal 34 also on shaft 32' but independently journalled thereon pulls a similar rod or cable which operates the internally disposed brakes 4b operated in contact with brake drum 4a see Fig. 7, on the front wheel assembly and similarly within brake drum 20 of the rear drive wheel, it operates a like internally expanding brake.

The accelerator control is also rigged in conventional manner from the foot pedal 33 and passes like the clutch control through the subbody 2 through the lightening holes in the cross braces 1b through appropriate bellcranks to operate the fuel control to motor 3 in the streamlined rear of the van. The motor drive is greatly simplified and made noiseless by use of two or more V-belts 17 which drive the rear wheel through the V-wheels 21. It is understood that these drive pulleys and the wheel and tire 6—8 on wheel 18 together with the short shaft 18' are all adequately held in yieldable alignment by the swinging frame 19 journalled to reinforced fore and aft portions of the engine bearers 16 and in direct line with the motor crank shaft and the driving V-pulleys 18a, see Fig. 4. As heretofore noted this frame had a bridge truss 19' which unites with an inverted U brace 19a, see Fig. 6 to prevent any lateral alteration in the plane of wheel 18. It will be apparent, to those skilled in the art, from the drawings that my improved bracket, wheel and spindle construction combined with the elastic spoke type tire do not require the wheel camber, king pin inclination, caster or toe-in which victimize conventional steering mechanisms.

For still greater efficiency and ease of control I have interposed a powerful type of novel fluid drive 42 between the conventional gear box 37 and the driving V-pulleys 18a, see Figs. 4 and 14, where the drive shaft 42' from the gear box supports the fluid drive housing 42 which is free to rotate as an auxiliary flywheel on ball bearings 42a about shaft 42' and a sleeve 42b from said fluid drive flywheel carries and drives the V-wheels 18a Fig. 15 shows an internal view of my type of fluid drive which should have much less slippage than earlier types because the driving shaft 42' has keyed thereto a driving bucket wheel 43 provided with baffles or baffle plates 43' at its outer circumference. This bucket wheel 43 is centrally disposed between two sets of baffle plates 43a which are integral with the inside of the casing 42 and in addition casing 42 carries other baffle plates 43b which lie circumferentially beyond the baffles 43' on driving wheel 43.

When the casing 42 is partially filled with oil or other suitable fluid and the bucket wheel 43 is revolved the oil will move the casing 42 by reason of the proximity of the casings' baffles to the baffles of the driving wheel 43, because the buckets or baffles of wheel 43 are centrally located, i. e. surrounded on both sides and one end by the baffles of casing 42 to be driven there will be far less slipping when heavy driving, such as hill climbing, is required.

The operation of my simplified truck will be readily understood from the foregoing: For both the light and loaded conditions the loads are well distributed and when only partial loads are carried they can be placed conveniently in the double doorway or in the compartment over the motor to improve traction on the rear drive wheel: The novel arrangement of motor and swingframe drive combined with the improved vision driver's cab and convenient intermediate loading space, all hung in tension rubber located above the wheel center and above the center of gravity location make for improved riding quality safety and simplification.

The chief elements accomplishing the comparatively high position of the springing are my tire spokes 6, for details see Fig. 7. These are molded rubber and their most essential parts are the cross ribs 6b, which provide a finely graduated vertical yielding, but an adequate lateral strength for the tire.

Those skilled in the art will understand the need for the externally molded reinforcements 6b, since this is the first time in motor vehicle history that the entire weight of a vehicle has depended for springing action upon tension means located above the vehicle road wheels. The cross-ribs 6b not only add tension rubber to the forms of the spokes shown in my former patents (see for example 2,492,433) but also increase the proportion of lateral resistance in the tire to compensate for any desired elongation of the spokes (which can be built into the spokes upon assembly to the vehicle wheel), giving them a longer range of vertical movement. In other words, all former showings of elastic spokes provided with cross-ribs for lateral strength were adapted to replace pneumatic tires and be associated with other, or steel spring, types of springing for the vehicle. The vehicle wheel may be a typical stamped wheel disc 4', having welded thereto a stamped rim 8c which has press fitted into it the cross-bars 8b: The rubber spokes 6 have molded socket lugs 6a which fit around the cross bars 8b, forming the tire attachment to the wheel. On the outer end of the spokes 6 are lugs 6' which surround a hickory lock pin 8a and the three tread hoops 8 carry corresponding lugs 8' which also fit tightly around the pin 8a. The device for making a close fit is to use a small molding pin in molding the spokes, thus the sockets will be forced to expand around the pin 8a and also the cross bars 8b after the same fashion. Hickory hoop fillers 8c provide the back-bone or flexible strength to the tread hoops 8 and are bonded within the rubber envelope of 8. Reference is made to Fig. 10 of my Patent No. 2,050,352, dated August 11, 1936.

These fillers 8c are converted into a stronger and non-warping type of material by being placed in a liquid sulphur bath for 50 minutes. The impregnated sulphur drives out most of the moisture in the wood and partially replaces with sulphur crystals. Those skilled in the art will realize that the range of shock-absorbing movement afforded by the flexible tread hoops and the pre-tensioned spokes, designed to buckle rather than take compression loads compares favorably with the steel springs plus pneumatic tire range of conventional autos.

This springing aided in the rear by the shock cords 22 permits movement at higher speeds over rough roads than is possible with steel springs and higher centers of gravity and the streamlined form of the van rear allows higher speeds with comparatively low horsepower. But for practical use the high front vision made available for the driver combines with the sub-body of my van to simplify my auto structure. The sub-body affording a strong foundation for bolting to it the power unit, steering gear and wheel assemblies while also providing convenient space for the controls from driver's cab to rear motor compartment.

While my invention resides in the forgoing disclosures of novel combinations, it will be seen that considerable adaptations can be made without departing from my teachings and what I particularly claim is:

1. In combination with a vehicle, a box-like sill structure spaced from a supporting surface; a rigid wheel-mounting bracket extending laterally outwardly from each side of said sill structure; one end of each of said brackets being rigidly secured to a corresponding side, and adajcent the forward end, of said sill structure; each of said brackets extending upwardly and terminating in a free end above the bottom of said sill structure; a wheel mounting spindle for each of said brackets and mounted on the free end of each of said brackets for pivotal movement in a fixed horizontal plane about a vertical axis whereby to provide a low center of gravity for said vehicle; a yieldable wheel assembly for springing said vehicle mounted on each of said spindles; each wheel assembly comprising a riged wheel disc rotatably mounted on said spindle; a flexible tire hoop concentric with and spaced radially outward of said disc, and a plurality of pretensioned flexible spokes, one end of each of said spokes secured to said disc and the other end of each of said spokes secured to said hoop, whereby changes in distance between the supporting surface and the sill is taken up solely by said flexible spokes and rim; means interconnecting said wheel assembly for uniform steering movement; a third yieldable wheel assembly mounted on said vehicle intermediate the sides, and adjacent the rear, of said sill; and power means on said vehicle drivingly connected to said third yieldable wheel assembly.

2. The combination defined in claim 1 and including a driver's seat supported on and in rigid relation with said sill.

3. The combination recited in claim 1 and including door means hinged on said vehicle rearwardly of said third yieldable wheel assembly and affording a free access to said third wheel assembly.

4. The combination in a motor driven vehicle, of a box-like body sill structure spaced from a supporting surface; a rigid wheel-mounting bracket extending laterally outwardly from each side of the said sill structure; one end of each of said brackets being rigidly secured to a corresponding side of said sill structure; each of the said brackets terminating in a free end above the bottom of said sill structure; a wheel mounting spindle mounted on the said free end of each said bracket for pivotal movement in a fixed horizontal plane about a vertical axis; a yieldable wheel assembly for springing the said vehicle mounted on each of the said spindles; each said wheel assembly comprising a rigid wheel disc rotatably mounted on said spindle; a flexible tire tread hoop concentric with and spaced radially outwardly of said disc, and a plurality of pretensioned elastic spokes, one end of each of said spokes secured to said disc and the other end of each of said spokes secured to the said hoop, whereby changes in distance between the supporting surface and the sill is taken up solely by the said elastic spokes and flexible hoop; means interconnecting the said wheel assembly for uniform steering movement, whereby all parts of the said vehicle are sprung equally through a comparatively long vertical range.

JAMES V. MARTIN.

References Cited in the file of this patent

UNITED STATES PATENTS

| Number | Name | Date |
|---|---|---|
| 617,332 | Glazier | Jan. 10, 1899 |
| 1,224,669 | Round | May 1, 1917 |
| 1,263,943 | Scott | Apr. 23, 1918 |
| 1,592,269 | Horine | July 13, 1926 |
| 1,660,880 | Neracher | Feb. 28, 1928 |
| 1,770,938 | Martin | July 22, 1930 |
| 1,866,724 | Raule | July 12, 1932 |
| 1,934,191 | Hoffman | Nov. 7, 1933 |
| 1,989,995 | Martin | Feb. 5, 1935 |
| 2,010,368 | Martin | Aug. 6, 1935 |
| 2,101,057 | Fuller | Dec. 7, 1937 |
| 2,121,504 | Martin | June 21, 1938 |
| 2,129,187 | Wesnigk | Sept. 6, 1938 |
| 2,209,259 | Christman | July 23, 1940 |
| 2,247,487 | Garnett et al. | July 1, 1941 |
| 2,283,274 | Martin | May 19, 1942 |
| 2,434,759 | Donovan | Jan. 20, 1948 |

FOREIGN PATENTS

| Number | Country | Date |
|---|---|---|
| 210,698 | Switzerland | Oct. 16, 1940 |
| 331,955 | Italy | Nov. 20, 1935 |
| 399,587 | Germany | Aug. 4, 1924 |
| 500,207 | Germany | June 19, 1930 |
| 724,212 | France | Jan. 25, 1932 |
| 782,308 | France | June 3, 1935 |